United States Patent Office 3,313,121
Patented Apr. 11, 1967

3,313,121
TEMPERATURE CONTROL MEANS AND REFRIGERATION SYSTEMS THEREFOR
William J. Barbier, 2900 Krem Ave.,
Overland, Mo. 63114
Filed July 29, 1964, Ser. No. 386,002
10 Claims. (Cl. 62—197)

The present invention relates generally to temperature control means and more particularly to temperature control valve means for controlling the temperature of refrigeration, air conditioning or other similar equipment.

There are many devices in existence for controlling the temperature and effects of refrigeration and air conditioning equipment, and many of the known controls include valve means and metering means to control the flow of a refrigerant in a system. For the most part, however, the known control means are relatively complicated, they require substantial pressures and pressure differentials for their operation, and they are incapable of accurately metering the flow of refrigerant in response to changes in temperature. Instead, the known devices usually control temperature by periodically shutting off or temporarily by-passing the flow of refrigerant. Furthermore, the known control means are relatively incapable of accurately operating on a controlled restricted flow basis and therefore they are unable to maintain as close a control on temperature as the subject device.

These and other disadvantages and shortcomings of known control devices and systems are overcome by the present invention which teaches the construction and operation of novel control means for regulating the operating temperature of refrigeration, air conditioning, cooling and other similar equipment and of novel systems in which the subject control means are employed.

A system constructed according to the present invention comprises compressor, condenser and receiver means connected in a series circuit, first valve means connected in series with an evaporator across the series circuits, said first valve means including a valve seat and a valve member movable relative thereto in response to changes in the temperature and pressure of refrigerant flowing through the evaporator at the outlet side thereof, second valve means and conduit means connected in another circuit across the first valve means and the evaporator to provide an alternate path for the flow of coolant in the series circuit, and temperature responsive means positioned to respond to a predetermined output temperature produced by the evaporator, said temperature responsive means being connected to said second valve means to control the opening thereof. The subject system may also include a pressure measuring line on the first valve means communicating with the outlet of the second valve means, and flow restricting means between the outlet from said second valve means and its connection to the series circuit.

Other variations and modifications of the subject system are also possible and some of these will be described and suggested in the specification which follows.

A principal object of the present invention is to provide improved means for controlling refrigeration, air conditioning and other similar equipment.

Another object is to provide means for more accurately maintaining a predetermined temperature condition.

Another object is to provide relatively simple and inexpensive temperature control means for refrigeration and other cooling equipment.

Another object is to provide mutually cooperative control means responsive to the same or to different control conditions.

Another object is to provide means for controlling the temperature of refrigeration and similar equipment without fully turning off or shutting off the flow of coolant in the system.

Another object is to provide a temperature control for refrigeration and other cooling equipment which can be installed on new as well as on existing equipment with a minimum of modification and change.

Another object is to simplify the construction, installation and maintenance of refrigeration equipment and the like.

These and other objects and advantages of the present invention will become apparent after considering the following detailed specification which discloses several preferred embodiments thereof in conjunction with the accompanying drawings, wherein.

Figure 1:
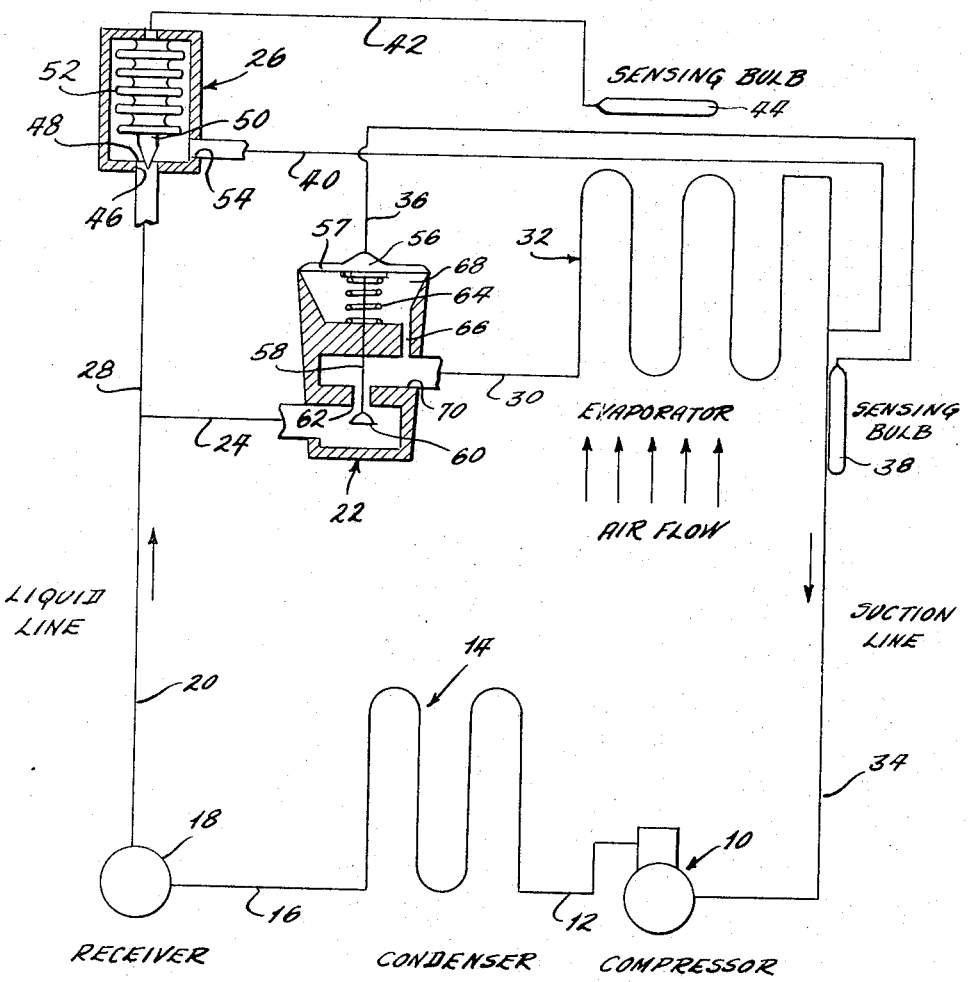
FIG. 1 is a schematic view of a refrigeration or cooling system including temperature control means constructed according to the present invention.

Referring to the drawings by reference numbers, number 10 in FIG. 1 denotes a compressor having an outlet side connected by conduit 12 to the inlet side of condenser 14. The outlet side of the condenser 14 is connected by another conduit 16 to a receiver 18 and the outlet from the receiver 18 is connected by liquid line 20 to the inlet side of a thermostatic expansion valve 22 by conduit 24 and also to the inlet side of a temperature pilot valve 26 by conduit 28. The outlet side of the thermostatic expansion valve 22 is connected by a conduit 30 to the inlet side of an evaporator 32 which is the main cooling element and which has its outlet connected by another conduit 34 to the low pressure or return side of the compressor 10. The thermostatic expansion valve 22 has another connection for control purposes which includes a conduit 36 connected at one end to the valve 22 and at the opposite end to a temperature sensing element or bulb 38. The bulb 38 is positioned adjacent to the return conduit 34 and responds to the temperature of the fluid flowing therethrough.

The pilot valve 26 has an outlet port connected to a conduit 40, and the opposite end of the conduit 40 is connected to the return conduit 34 ahead of the temperature sensitive element 38. The element 38 therefore responds to the temperature produced by the combined effect of the flows through both valves 22 and 26. The valve 26 is also connected by conduit 42 to a temperature sensitive element or bulb 44 which is positioned to respond to the temperature of a controlled environment such as an air space being cooled by the evaporator 32.

The pilot valve 26 has an inlet port 46 which forms a valve seat 48 that cooperates with a movable valve member 50 to control flow therethrough. The valve member 50 is connected to an expandable bellows structure 52 the interior of which is sealed and communicates with the temperature responsive bulb 44. When the temperature at the bulb 44 is low relative to the setting of the pilot valve 26 (which is the condition required for throttling the refrigerant) the pressure in the bellows 52 will also be reduced. The valve member 50 under these circumstances will therefore move away from the valve seat 48 and provide greater flow capacity through the pilot valve 26 between the inlet 46 and the outlet port 54. The flow through the pilot valve 26 by-passes the evaporator through conduit 40 and enters conduit 34 upstream from the sensing bulb 38. The latent cooling effect of this flow, as it mixes with the gas leaving evaporator 32, reduces the sensible temperature of the gas. The sensing bulb 38 responding to a reduced gas temperature in conduit 34 produces a reduction in the pressure in the upper chamber portion 56 of the expansion valve 22. In this case the reduced pressure in the chamber 56 will operate to cause the flexible wall 57 and a movable member 58 biased there against including a connected movable valve portion 60 to move upwardly to reduce flow through valve 22 and hence also through the evaporator 32. In other words, valve 22 operates under the control of pilot valve 26, under the conditions described to reduce the total cooling produced by the system.

In like manner, as the temperature under control of the evaporator 32 rises, the reverse conditions will take place and the valve 22 under the control of valve 26 will operate to increase the total cooling produced by the evaporator 32. For example, an increase in the temperature sensed by the element 44 will expand the bellows 52 in the pilot valve 26 and will move the movable valve member 50 toward the valve seat 48 thereby reducing or restricting flow through the by-pass conduit 40 and reducing the latant cooling effect of the by-pass flow allowing the sensible temperature of the gas in conduit 34 to increase. The increase in temperature sensed by the element 38 will produce relatively high pressure in the chamber 56 of the expansion valve 22 to move the valve member 60 downwardly and away from the seat 62. This will increase the flow through the evaporator 32. It can therefore be seen that the system is fully reversible and furthermore that the valve 22 operates under the control of valve 26 to produce the desired conditions.

The expansion valve 22 is also shown provided with a spring 64 which is positioned between a fixed housing wall and a portion of the movable valve member 58. The spring 64 biases the movable valve member 58 against the flexible wall or diaphragm 57 and the spring is also selected to maintain a predetermined operating condition for the valve 22. The spring 64 can also be made adjustable if desired. The expansion valve 22 is also provided with a pressure equalizer passage 66 connected between chamber portion 68 and the valve outlet 70. The pressure equalizer passage 66 allows the pressure in the outlet 70 to act with the spring 64 against the bottom of the flexible wall or membrane 57 to balance the pressure in the chamber 56 and position movable member 58.

Figure 2:
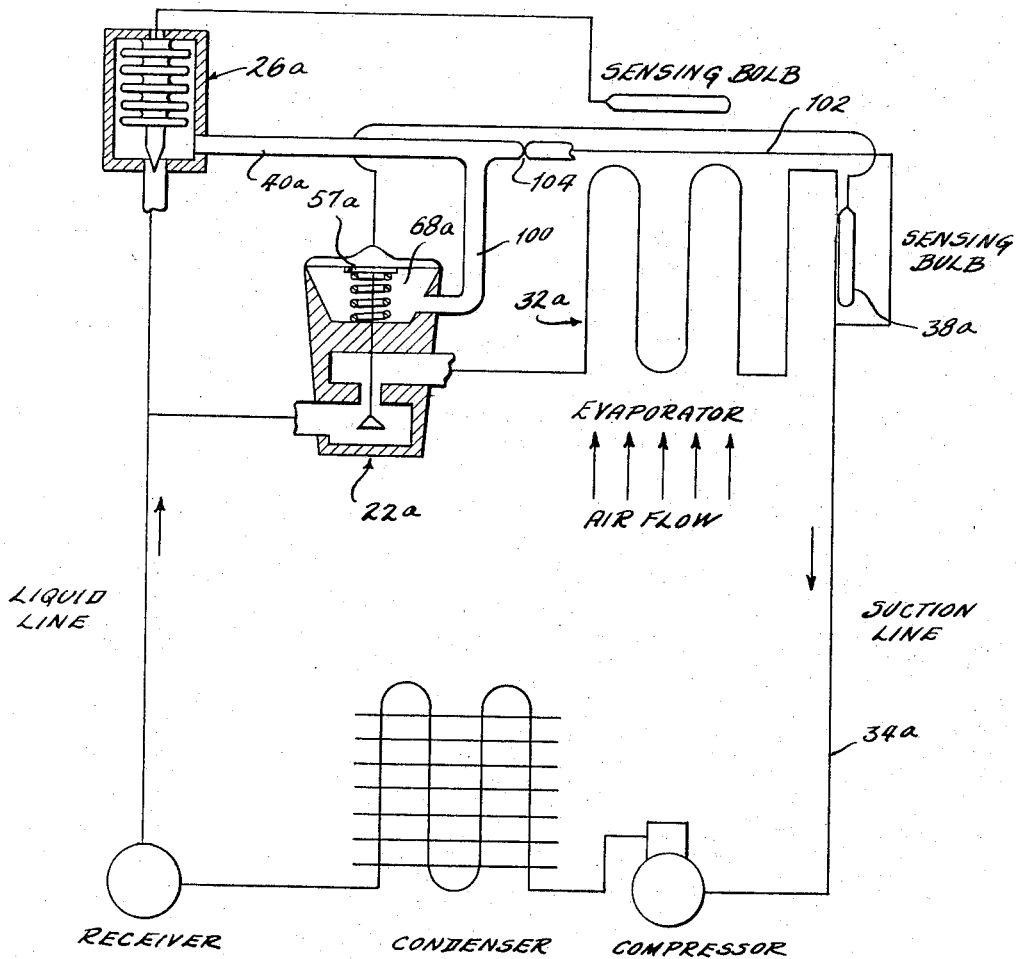
FIG. 2 is a schematic view showing a modified form of system employing control means constructed according to the invention.

FIG. 2 shows a modified form of the system shown in FIG. 1 with similar parts identified by the same numbers with a suffix "a." In the modified system, the expansion valve 22a has a chamber 68a partly defined by a flexible wall 57a which chamber is connected by a conduit 100 to the outlet conduit 40a of the pilot valve 26a. The conduits 100 and 40a are also connected to the compressor suction line 34a by another conduit 102 which has a flow restricting orifice 104 positioned therein. In the modified system, the conduit 102 is also shown for illustrative purposes connected to the suction line 34a downstream from the temperature sensitive element 38a instead of upstream relative thereto as in the system of FIG. 1. This means that the temperature sensitive element 38a responds only to the temperature of the fluid in the return line from the evaporator 32a and not to the temperature of the total return flow to the compressor. The element 38a could, however, also be positioned to respond to the total return as in FIG. 1, if desired. Except for the above differences between the modified system and the system of FIG. 1, the systems operate to produce substantially the same results.

In the modified system of FIG. 2, the operation is similar to that of FIG. 1, in that the actions of the expansion valve 22a are controlled by the pilot valve 26a. The difference is in the manner in which the pilot valve 26a performs its control of the expansion valve 22a. Furthermore, in the modified system of FIG. 2 if the by-pass valve 26a is open then the pressure in the chamber 68a of the expansion valve 22a is maintained somewhat higher than in the chamber 68 because of the restricted flow capacity of the orifice 104. This changes the operating characteristics of the valve 22a by having the pressure changes produced by the bulb 38a operate against a relatively higher pressure. The system of FIG. 2 therefore uses pressure biasing which is different from the system of FIG. 1.

Figure 3:
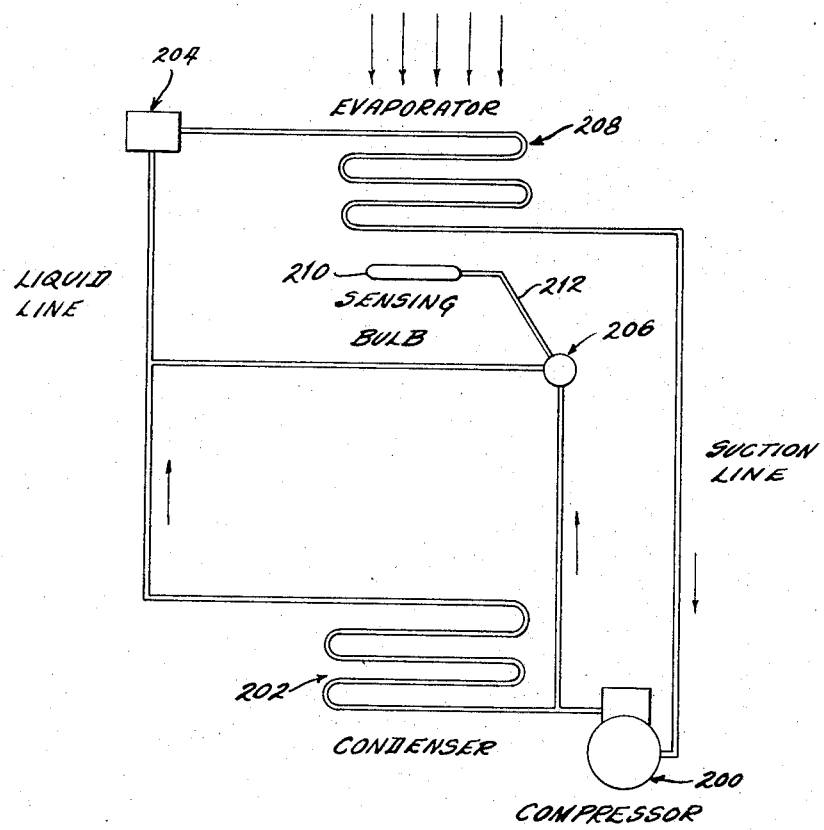
FIG. 3 is a schematic view of another system having temperature control means constructed according to the present invention.

FIG. 3 shows another modified refrigeration or cooling system having a compressor 200, a condenser 202, an expansion device 204, a pilot valve 206 and an evaporator 208. In this system, the compressor 200, the condenser 202, the expansion device 204, and the evaporator 208 are connected in a series circuit for producing refrigeration or cooling. The expansion device 204 can be of a construction similar to the valves 22 or 22a or it can be a constant pressure expansion device or a simple non-controllable restriction type expansion device or any other known expansion device.

The pilot valve 206 in the modified system of FIG. 3 is connected in a by-pass circuit which is across the condenser rather than across the evaporator. The pilot valve 206 may be of a construction similar to the valves 26 and 26a of FIGS. 1 and 2 respectively, and in like manner, may be controlled by a connection to a temperature sensing element 210 connected thereto by a conduit 212. The element 210 is positioned to respond to the temperature of an environment under control of the evaporator 208. In this case, the pilot valve 206 controls the fluid flow through the condenser 202 from the compressor 200 and it also provides a path for fluid directly from the compressor to the evaporator 208. When the temperature of the evaporator environment is reduced below the setting of valve 206, the valve will open allowing the hot discharge gas to by-pass the condenser 202 and enter the liquid line. The heat of the by-passed discharge gas reduces the sub-cooling of the liquid and causes a portion of the liquid flow to change phase into a gaseous form. The greatly increased specific volume of the mixture entering the expansion device reduces the flow of refrigerant through the device. This, in turn, reduces the cooling effect of evaporator 208.

This system is also reversible. For example, when the evaporator environment increases above the setting of valve 206, the valve will close stopping the by-pass flow of discharge gas around the condenser 202. The refrigerant from the condenser 202 can then flow in the high density liquid phase through the expansion device, obtaining maximum flow through said device, increasing the cooling effect of evaporator 208.

In the modified system of FIG. 3, the expansion valve 204 can be replaced by an expansion device such as an expansion restriction which will flow a lesser amount of refrigerant in gaseous form. Such a device will reduce the output of the evaporator 208 and will increase the temperature affected by the cooling action thereof.

As pointed out above, the operation of all of the disclosed systems are reversible. This is important because it means that the subject control means can control temperature within relatively narrower limits than has been possible heretofore. The present controls and systems can also be used for many different applications including refrigeration and air conditioning where relatively precise and fast acting temperature control is required. The simplicity of the subject control means and systems is also an important factor in making the subject valves and systems relatively economical, easy to install and maintain, and adaptable for use with existing as well as with new equipment.

Thus there has been shown and described novel temperature control means for refrigeration, cooling and other similar equipment, and novel systems including such control means which fulfill all of the objects and advantages sought therefor. Many changes, alterations, modifications and other uses and applications of the subject control means and system will, however, become apparent to those skilled in the art after considering this specification which discloses several preferred embodiments thereof. All such changes, alterations, modifications and other uses and applications of the subject control means and systems which do not depart from the spirit and scope of the invention are deemed to be covered by the invention which is limited only by the claims which follow.

What is claimed is:

1. A temperature controlled system comprising serially connected compressor, condenser, and evaporator means, said evaporator means being positioned to cool a predetermined enclosure, by-pass means connected across the compressor and one of the other associated serially connected means, valve means controlling flow through the by-pass means, a temperature responsive bulb operatively connected to the valve means including means to control the flow capacity thereof, said temperature responsive bulb being positioned to respond to the temperature of the enclosure and expansion means connected in series circuit with the evaporator means on the upstream side thereof, said expansion means and said by-pass means having inlets connected in common.

2. A temperature controlled system comprising serially connected compressor and condenser means, serially connected evaporator and expansion means connected across the serially connected compressor and condenser, said evaporator being positioned to cool a predetermined enclosure, said expansion means including relatively movable valve members for controlling flow through the evaporator, means responsive to a predetermined temperature condition produced by the system for controlling the relative positions of the relatively movable valve members to control flow through the evaporator, and by-pass means connected across the serially connected expansion and evaporator means, said by-pass means including other valve means having relatively movable valve members, and a temperature sensitive bulb positioned to respond to the temperature in the cooled enclosure, and means operatively connecting said bulb to the other valve means for controlling the relative positions of said last named relatively movable valve members.

3. The temperature controlled system defined in claim 2 wherein said expansion valve means increases flow through the evaporator in response to an increase in the temperature of the condition sensed by the associated temperature responsive means and reduces flow through the evaporator in response to a decrease in said temperature condition, said by-pass valve means operating to increase flow through the by-pass means in response to a decrease in the temperature sensed by said other temperature responsive means and to reduce flow therethrough in response to an increase in the said sensed temperature.

4. Means for controlling temperature comprising a source of cooling fluid, means connecting said source for flow through expansion means and through an evaporator in series therewith, said evaporator being positioned to cool a defined area, means for metering a controlled portion of the cooling fluid around the serially connected expansion means and evaporator, said metering means including conduit means and valve means having relatively movable cooperating valve members for controlling flow therethrough, and means for controlling the relative positions of said valve members including temperature sensitive means positioned to respond to the temperature of the defined area, said temperature sensitive means having a connection to said metering valve means, said temperature sensitive means producing pressure changes in the metering valve means in response to changes in the temperature of the defined area, said pressure changes operating to affected changes in the relative positions of said relatively movable valve members, 5. The temperature control means defined in claim 4 wherein said metering valve means include an expandable chamber having a movable wall member operatively connected to one of said relatively movable valve members, said temperature sensitive means including a bulb member having a fluid connection to said expandable chamber.

6. The temperature control means defined in claim 4 wherein said metering means has a flow limiting restriction therein.

7. A refrigeration system comprising serially connected compressor, condenser, receiver, expansion, and evaporator means connected to form a closed circulating refrigerant system, a by-pass circuit including conduit means and by-pass control valve means connected in the system between a point upstream of the expansion means and a point downstream of the evaporator means providing an alternate path for refrigerant flow under certain conditions, said expansion means including a thermostatic expansion valve having an inlet connected to the receiver, an outlet connected to the evaporator, a valve seat between the inlet and outlet, a valve member movable relative to the valve seat to control flow through the expansion device and through the evaporator, and means for controlling the position of the movable valve member relative to the valve seat including a chamber and a flexible diaphragm dividing the chamber into separate chamber portions, said diaphragm having an operative connection with the movable valve member, a temperature sensitive bulb positioned to respond to the temperature of refrigerant flowing in the system at a location downstream relative to the evaporator and upstream relative to the downstream connection of the by-pass circuit, said bulb communicating with the chamber portion on one side of the diaphragm to produce pressure changes therein in response to changes in the tempearture sensed thereby, a fixed flow restriction positioned in the by-pass circuit downstream relative to the by-pass control valve means, means communicating the by-pass conduit upstream of the flow restriction with the chamber portion of the expansion valve on the opopsite side of the diaphragm from the chamber portion that comumnicates with the temperature sensing bulb, said by-pass control valve means having a valve seat and a valve member movable relative thereto, and a second temperature sensing bulb positioned to respond to a temperature condition produced by the evaporator, said second temperature sensing bulb having an operative connection with the by-pass control valve to control the position of the movable control valve member relative to the valve seat.

8. Temperature control means comprising a compressor and condenser connected in series, an evaporator circuit and a by-pass circuit connected in parallel across said series connected compressor and condenser, and means for distributing fluid flow between said parallel circuits, said evaporator circuit including evaporator means and an expansion valve having relatively movable valve members controlling the flow capacity therethrough, means for controlling the relative positions of said movable valve members in response to a predetermined temperature condition produced by the evaporator, said temperature control means including means responsive to the temperature of fluid flowing from the evaporator back to the compressor, said by-pass circuit including other valve means having relatively movable valve members, and second temperature control means therefor, said second temperature control means being positioned to respond to the temperature condition produced by the evaporator and producing pressure changes in said second valve means in response to changes in said temperature condition to reposition one of said relatively movable valve members to change the flow capacity of the by-pass circuit, said by-pass circuit having a fixed flow restriction therein.

9. The temperature control means defined in claim 8 wherein said expansion valve means has a pressure biasing connection to the by-pass means upstream of said flow restriction.

10. Temperature control means comprising a compressor and condenser connected in series, an evaporator circuit and a by-pass circuit connected in parallel across said series connected compressor and condenser, and means for distributing fluid flow between said parallel circuits, said evaporator circuit including evaporator means and an expansion valve having relatively movable valve members controlling the flow capacity therethrough, means for controlling the relative positions of said movable valve members in response to a predetermined temperature condition produced by the evaporator, said temperature control means including means responsive to the temperature of fluid flowing from the evaporator back to the compressor, said by-pass circuit including other valve means having relatively movable valve members, and second temperature control means therefor, said second temperature control means being positioned to respond to the temperature condition produced by the evaporator and producing pressure changes in said second valve means in response to changes in said temperature condition to reposition one of said relatively movable valve members to change the flow capacity of the by-pass circuit, said expansion valve including a valve seat and a valve member movable relative to said seat to control flow therethrough, means including a flexible wall member forming a sealed enclosure adjacent to said movable valve member, said sealed enclosure being connected to the temperature control means, yieldable means associated with said movable valve member for holding said movable valve member against the flexible wall member, said flexible wall member moving said movable valve member relative to the valve seat in response to changes in the pressure in the sealed enclosure.

References Cited by the Examiner

UNITED STATES PATENTS

| | | | |
|---|---|---|---|
| 2,280,425 | 4/1942 | Sanders | 62—198 X |
| 2,353,240 | 7/1944 | Huggins | 62—197 |
| 2,571,625 | 10/1951 | Seldon | 62—225 X |
| 2,876,629 | 3/1959 | Dube | 62—196 X |
| 3,014,352 | 12/1961 | Leimbach | 62—197 |
| 3,099,140 | 7/1963 | Leimbach | 62—197 |
| 3,196,630 | 7/1965 | Barbier | 62—197 |

MEYER PERLIN, *Primary Examiner.*